United States Patent
Lin

(10) Patent No.: US 6,782,935 B2
(45) Date of Patent: Aug. 31, 2004

(54) HOT LAMINATING APPARATUS HAVING SINGLE-SIDED TRANSMITTING AND HEATING ROLLER

(75) Inventor: Shin-Fu Lin, Taipei (TW)

(73) Assignee: Primax Electronics, Ltd. (TW)

( * ) Notice: Subject to any disclaimer, the term of this patent is extended or adjusted under 35 U.S.C. 154(b) by 0 days.

(21) Appl. No.: 10/641,418

(22) Filed: Aug. 15, 2003

(65) Prior Publication Data

US 2004/0031571 A1 Feb. 19, 2004

(30) Foreign Application Priority Data

Aug. 16, 2002 (TW) .......................... 91118600 A

(51) Int. Cl.⁷ ............................................. B32B 31/04
(52) U.S. Cl. .................. 156/555; 156/499; 156/582; 156/583.1; 100/210
(58) Field of Search ................................. 156/499, 555, 156/580, 582, 583.1; 100/327, 328, 334, 210

(56) References Cited

U.S. PATENT DOCUMENTS

| | | | | | |
|---|---|---|---|---|---|
| 4,021,288 A | * | 5/1977 | Hannon et al. | ............. | 156/499 |
| 4,102,730 A | * | 7/1978 | Staats | ............. | 156/499 |
| 4,353,776 A | * | 10/1982 | Giulie et al. | ............. | 156/555 |
| 5,158,641 A | * | 10/1992 | Vermeulen et al. | ......... | 156/555 |
| 5,716,490 A | * | 2/1998 | Kuhns et al. | ............. | 156/499 |
| 5,746,878 A | * | 5/1998 | Kuhns et al. | ............. | 156/364 |
| 6,418,996 B1 | * | 7/2002 | Hsiao | ............. | 156/555 |

* cited by examiner

*Primary Examiner*—James Sells
(74) *Attorney, Agent, or Firm*—Madson & Metcalf

(57) ABSTRACT

A hot laminating apparatus has a single-sided transmitting and heating roller. A heating plate is used instead of a transmitting and heating roller at the opposite side of the transmission passage in order to heat the thin film in contact therewith and cooperate with the single-sided transmitting and heating roller to transmit the thin films to be laminated. The heating plate is efficient in heating the thin film and generally less expensive than the transmitting and heating roller.

17 Claims, 5 Drawing Sheets

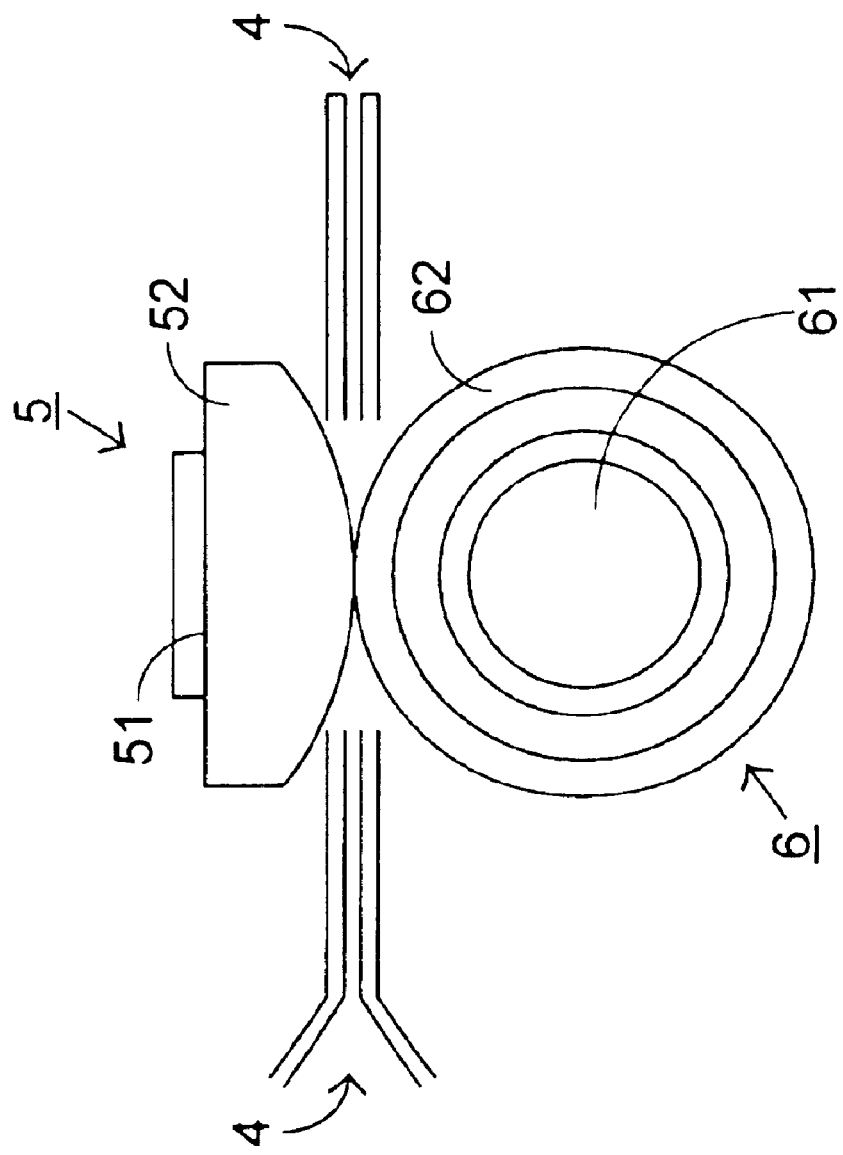

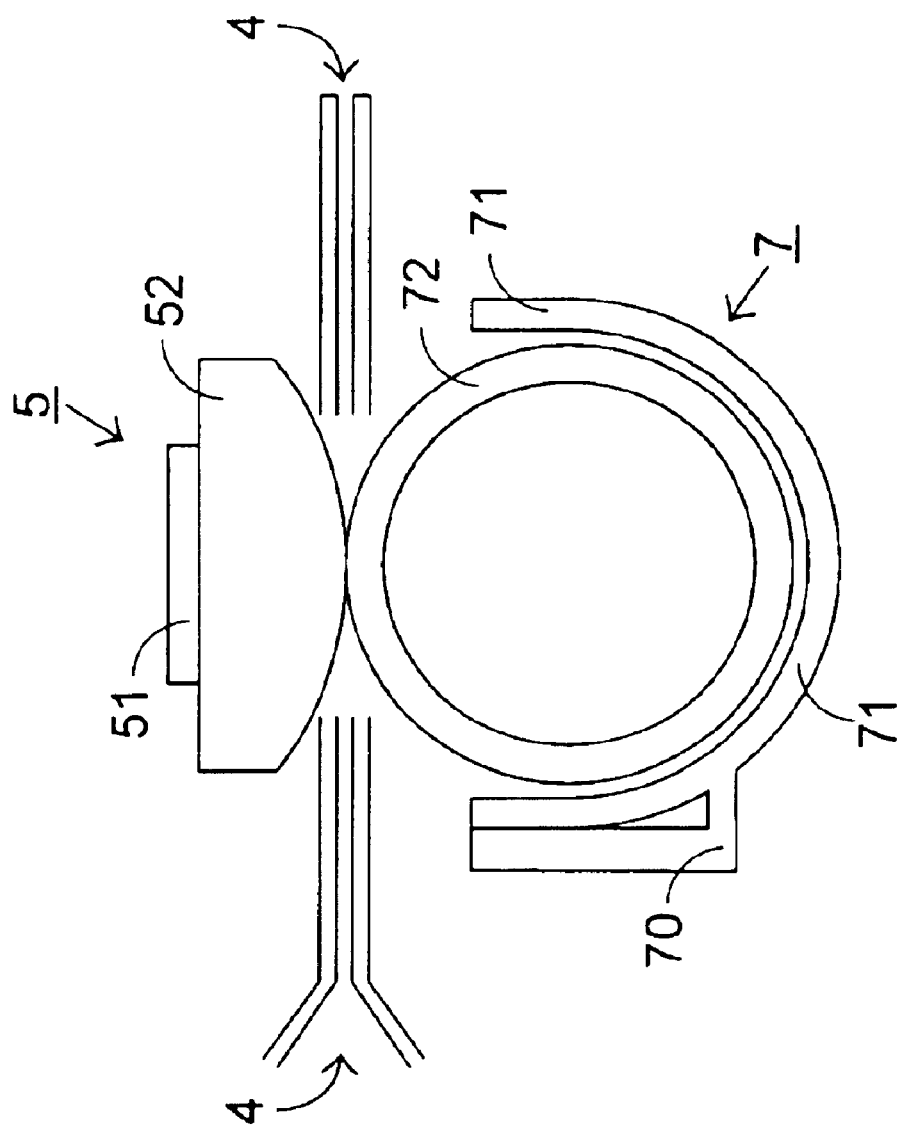

HOT LAMINATING APPARATUS HAVING SINGLE-SIDED TRANSMITTING AND HEATING ROLLER

FIELD OF THE INVENTION

The present invention relates to a hot laminating apparatus, and more particularly to a hot laminating apparatus having a single-sided transmitting and heating roller.

BACKGROUND OF THE INVENTION

Laminating apparatuses are widely used for laminating a sheet between two pieces of plastic films. A conventional laminating apparatus shown in FIG. 1(a) principally comprises two pairs of rollers, i.e. front rollers 10 and rear rollers 11, and a heating unit 12. The front rollers 10 comprise an upper front roller 101 and a lower front roller 102, while the rear rollers 11 comprise an upper rear roller 111 and a lower rear roller 112. The heating unit 12 comprises an upper heating element 121 and a lower heating element 122. The heating unit produces heat from electricity. The process for laminating a sheet material by way of the laminating apparatus is illustrated as follows. The sheet material is sandwiched between a pair of plastic films. The sandwiched structure is then fed to the passage between the upper heating element 121 and the lower heating element 122 by means of the front rollers 10, and the plastic films are heated and thus softened. Then, the sandwiched structure advances and is pressed to laminate by means the rear rollers 11 so as to bond the sheet material with the plastic films.

In the above-mentioned laminating apparatus, since the heating mechanism and pressing mechanism are separately performed by two individual units, the materials of the sheet and the plastic films should be limited to some special combinations in view of the heating and laminating timings. In addition, the laminating effect of such laminating apparatus is sometimes not satisfied, for example, due to formation of some bubbles in the resulting article.

In order to overcome the drawbacks, another laminating apparatus as shown in FIG. 1(b) was developed. Such laminating apparatus, also referred as "hot shoe", comprises only a pair of rollers 22. The heat generated by heating plates 21 is uniformly distributed over aluminum extrusion elements 20, and radiated to heat up the rollers 22. Therefore, when the sheet material sandwiched between a pair of plastic films is fed through the rollers 22, the heating and pressing mechanisms are simultaneously performed thereon so as to avoid the problem of forming bubbles. Since heat for pressing the sandwiched structure is transferred to the rollers 22 through air gaps between the aluminum extrusion elements 20 and the rollers 22, a relatively long waiting time, for example 10–15 minutes, is required to warm up the laminating apparatus. Therefore, another laminating apparatus as shown in FIG. 1(c) was developed to solve this problem.

Please refer to FIG. 1(c). The laminating apparatus includes a pair of electro-heaters 30 disposed inside a pair of rollers 31, respectively. The rollers 31 are disposed to form a passage therebetween for passing therethrough the object to be laminated. The rollers 31 wrapping therein the electro-heaters 30 can thus quickly reach the operation temperature due to the direct heat transfer from the inner heaters 30 to the rollers 31. This laminating apparatus, although has a compact size as well as high heating efficiency, is every expensive. Therefore, the cost is high and the commercial competence is comparatively low.

Therefore, the purpose of the present invention is to develop a hot laminating apparatus to deal with the above situations encountered in the prior art.

SUMMARY OF THE INVENTION

An object of the present invention is to provide a hot laminating apparatus, which uses a decreased number of electro-heater-contained rollers and designs another relatively cheap mechanism in stead, so as to reduce the cost without decreasing the heating efficiency.

According to a first aspect of the present invention, a hot laminating apparatus having a transmission passage for passing therethrough thin films to be hot laminated, comprises: a still heating member disposed at a first side of the transmission passage for heating a first one of the thin films in contact therewith; and a transmitting and heating roller disposed at a second side of the transmission passage for heating a second one of the thin films in contact therewith, and rotating relative to and cooperating with the heating member to transmit the thin films through the transmission passage while pressing the thin films to be laminated.

Preferably, the heating member includes a heater for providing thermal energy; and a heat-transmitting element disposed between the heater and the first side of the transmission passage for transmitting the thermal energy from the heater to the first one of the thin films.

Preferably, the heater is an electro-heater for transforming electric energy into the thermal energy.

Preferably, the heat-transmitting element is made of a heat-conducting material, and the thermal energy is transmitted from the heater to the first one of the thin films in a manner of heat conduction. The heat-transmitting element, for example, is made of aluminum.

Preferably, the heat-transmitting element has a shape conformable to the shape of the transmitting and heating roller so as to facilitate the transmission of the thin films through the transmission passage. Accordingly, the heat-transmitting element can be an aluminum extrusion plate having a curved surface facing the transmitting and heating roller.

Preferably, the transmitting and heating roller includes an electro-heater for transforming electric energy into thermal energy; and a roller element disposed between the electro-heater and the second side of the transmission passage for transmitting the thermal energy from the electro-heater to the second one of the thin films.

For example, the electro-heater of the transmitting and heating roller is wrapped with the roller element, and transmits the thermal energy to the roller element in a manner of heat conduction. Alternatively, the electro-heater of the transmitting and heating roller is arranged outside the roller element and transmits the thermal energy to the roller element via a heat-diffusing element partially surrounding the roller element in a manner of heat radiation.

A second aspect of the present invention relates to a hot laminating apparatus for laminating thin films, which comprises a heating plate having a heater at a first free end and a heat-conducting plate at a second free end; and a transmitting and heating roller cooperating with the heat-conducting plate to clamp the thin films and rotating to move relative to the thin films so as to heat and laminate different area of the thin films.

Preferably, the heat-conducting plate is an aluminum extrusion plate.

BRIEF DESCRIPTION OF THE DRAWINGS

The present invention may best be understood through the following description with reference to the accompanying drawings, in which:

FIG. 2 is a cross-sectional view schematically illustrating a first preferred embodiment of a hot laminating apparatus according to the present invention; and FIG. 3 is a cross-sectional view schematically illustrating a second preferred embodiment of a hot laminating apparatus according to the present invention.

DETAILED DESCRIPTION OF THE PREFERRED EMBODIMENT

Figure 1A:
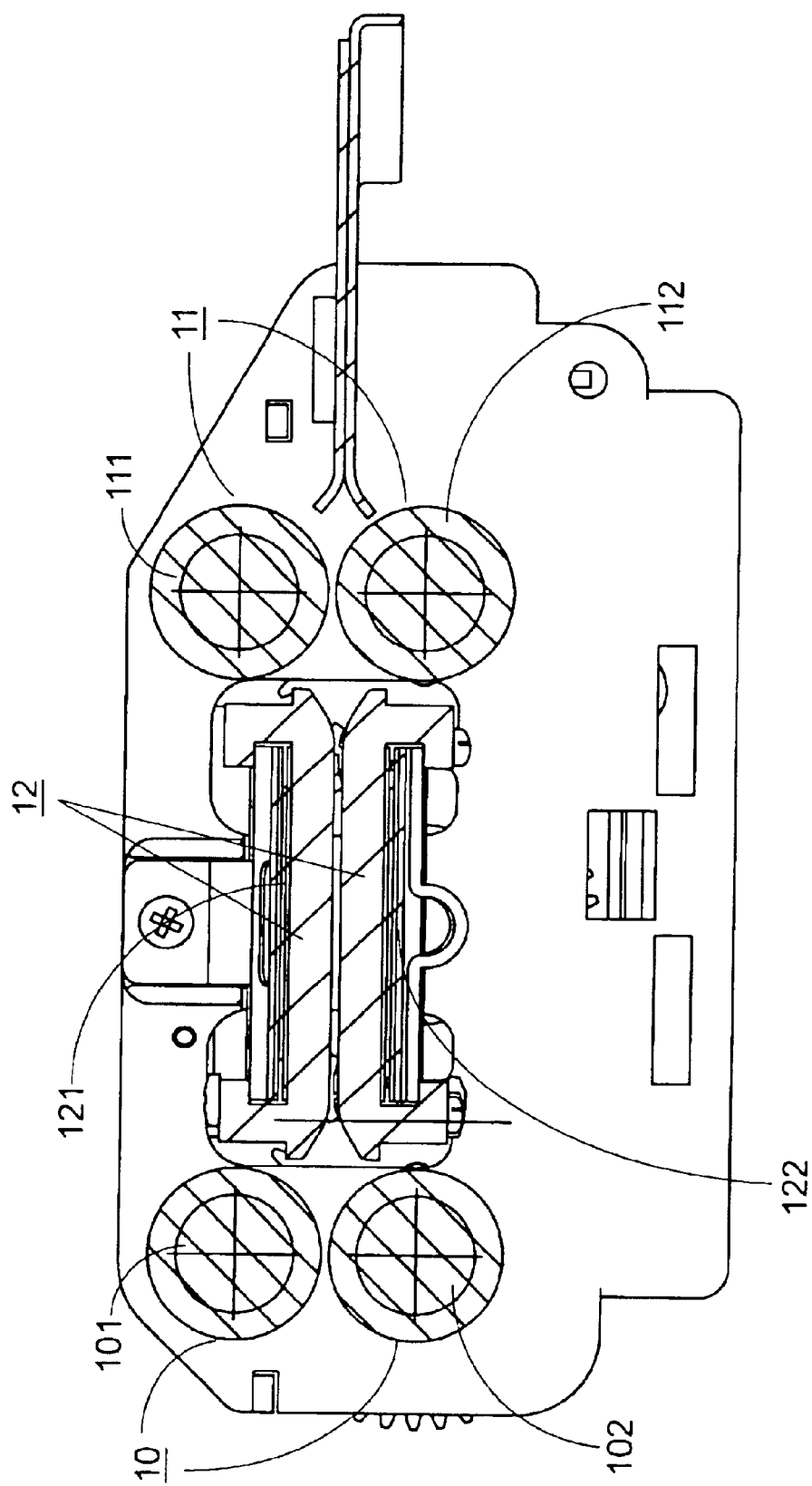
FIG. 1(a) is a cross-sectional view schematically illustrating a first conventional hot laminating apparatus.
Figure 1B:
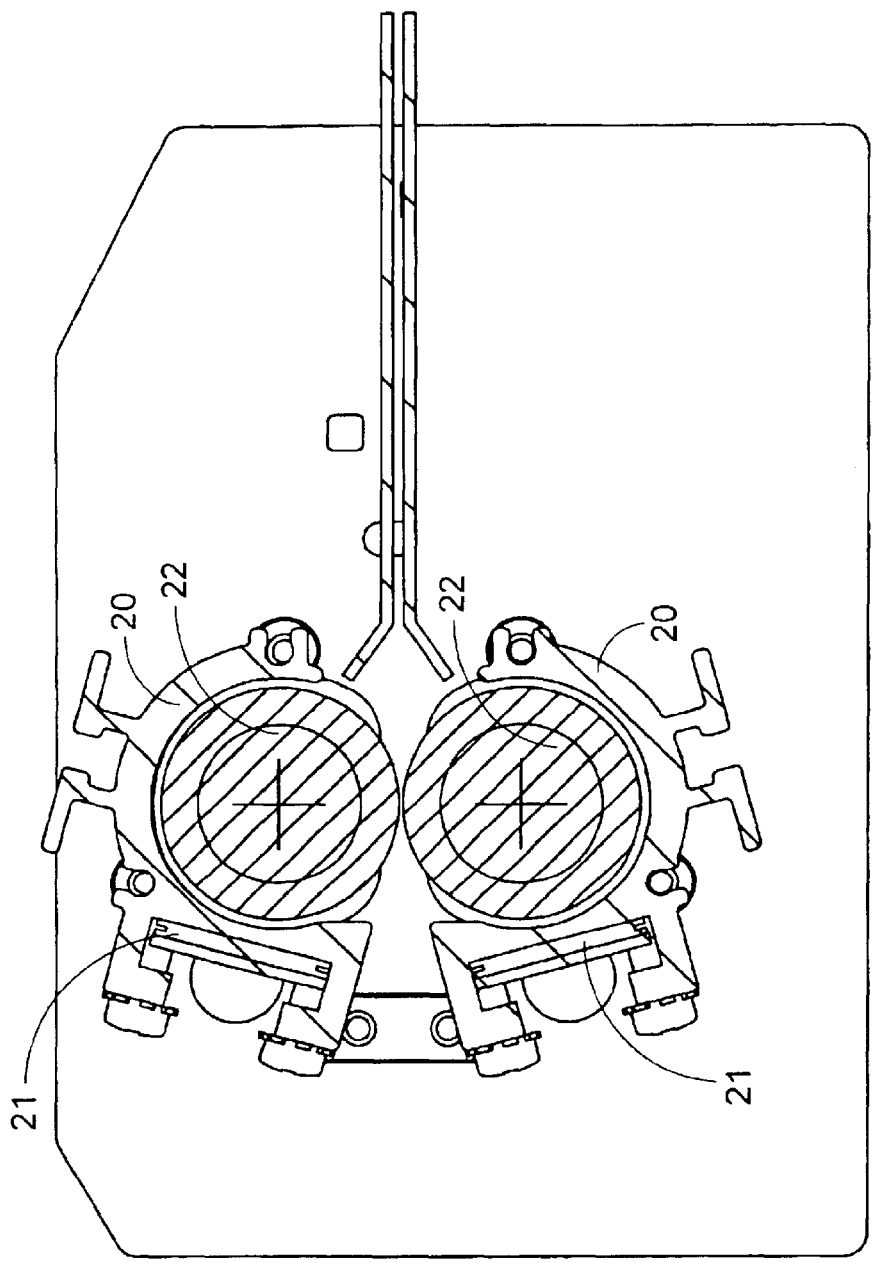
FIG. 1(b) is a cross-sectional view schematically illustrating a second conventional hot laminating apparatus.
Figure 1C:
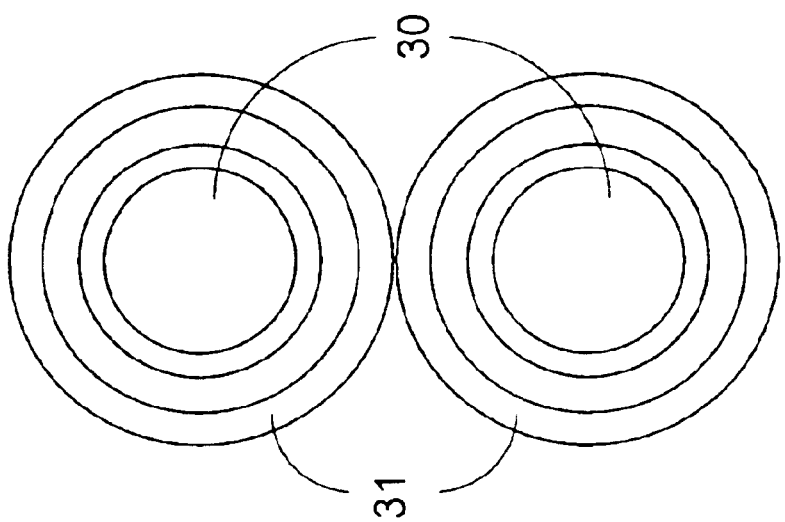
FIG. 1(c) is a cross-sectional view schematically illustrating a third conventional hot laminating apparatus.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Referring to FIG. 2, a preferred embodiment of a hot laminating apparatus according to the present invention is shown. The hot laminating apparatus is used for protecting a sheet material, e.g. paper document or picture, with one or more layers of thin films, e.g. thermoplastic films, by way of lamination. As shown in FIG. 2, the hot laminating apparatus includes a transmission passage 4 for passing therethrough the sheet material and thin films to be laminated. A heating plate 5 comprising an electro-heater 51 and a heat-conducting plate 52 and a transmitting and heating roller 6 comprising an electro-heater 61 and a roller element 62 are arranged at two opposite sides of the transmission passage 4.

In this embodiment, the electro-heater 61 is wrapped with the roller element 62. After the electro-heater 61 transforms electric energy into thermal energy, the thermal energy is conducted to the roller element 62 to heat the thin film in contact with the roller element 62. On the other hand, after the electro-heater 51 transforms electric energy into thermal energy, the thermal energy is conducted to the heat-conducting plate 52 to heat the thin film in contact with the heat-conducting plate 52. The heated portion of the thin films is thus fused to laminate the corresponding portion of the sheet material therebetween. By the clamping action of the heating plate 5 and the transmitting and heating roller 6 and the rotation of the transmitting and heating roller 6, the sheet material and the thin films are transmitted through the transmission passage 4 to be laminated portion by portion. The material of the heating roller 62 and the heat-conducting plate 52 are not specifically limited as long as the heat conduction can be well performed. For example, the heating roller 62 is made of rubber, and the heat-conducting plate 52 is made of aluminum. More preferably, the heat-conducting plate 52 is an aluminum extrusion plate having a curved surface conforming to the shape of the roller element 62 in order to provide heat substantially equivalent to the roller element 62 to the sheet material and thin films.

Another embodiment of a hot laminating apparatus according to the present invention is shown in FIG. 3. The hot laminating apparatus in this embodiment is similar to that shown in FIG. 2 except that the electro-heater 70 is located outside the roller element 72 and transmits the thermal energy to the roller element 72 via a heat-diffusing element 71 partially surrounding said roller element 72 in a manner of heat radiation. The heat-diffusing element 71, for example, is an aluminum extrusion element.

To sum up, a single-sided transmitting and heating roller is used in the hot laminating apparatus, and a heating plate is used instead of another transmitting and heating roller, as in the prior art, so as to reduce cost. The heating plate is disposed at the side of the transmission passage opposite to the single-sided transmitting and heating roller in order to heat the thin film in contact therewith and cooperate with the single-sided transmitting and heating roller to transmit the thin films to be laminated. The heating plate is efficient in heating the thin film and generally less expensive than the transmitting and heating roller.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hot laminating apparatus having a transmission passage for passing therethrough a sheet material and thin films to be hot laminated, comprising:

a still heating member disposed at a first side of said transmission passage for heating a first one of said thin films in contact therewith; and a transmitting and heating roller disposed at a second side of said transmission passage for heating a second one of said thin films in contact therewith, and rotating relative to and cooperating with said heating member to transmit said thin films through said transmission passage while pressing said thin films to be laminated.

2. The hot laminating apparatus according to claim 1 wherein said heating member includes:

a heater for providing thermal energy; and a heat-transmitting element disposed between said heater and said first side of said transmission passage for transmitting said thermal energy from said heater to said first one of said thin films.

3. The hot laminating apparatus according to claim 2 wherein said heater is an electro-heater for transforming electric energy into said thermal energy.

4. The hot laminating apparatus according to claim 2 wherein said heat-transmitting element is made of a heat-conducting material, and said thermal energy is transmitted from said heater to said first one of said thin films in a manner of heat conduction.

5. The hot laminating apparatus according to claim 4 wherein said heat-transmitting element is made of aluminum.

6. The hot laminating apparatus according to claim 2 wherein said heat-transmitting element has a shape conformable to the shape of said transmitting and heating roller so as to facilitate the transmission of said thin films through said transmission passage.

7. The hot laminating apparatus according to claim 6 wherein said heat-transmitting element is an aluminum extrusion plate having a curved surface facing said transmitting and heating roller.

8. The hot laminating apparatus according to claim 1 wherein said transmitting and heating roller includes:

an electro-heater for transforming electric energy into thermal energy; and a roller element disposed between said electro-heater and said second side of said transmission passage for transmitting said thermal energy from said electro-heater to said second one of said thin films.

9. The hot laminating apparatus according to claim 8 wherein said electro-heater of said transmitting and heating roller is wrapped with said roller element, and transmits said thermal energy to said roller element in a manner of heat conduction.

10. The hot laminating apparatus according to claim 8 wherein said electro-heater of said transmitting and heating roller is arranged outside said roller element and transmits said thermal energy to said roller element via a heat-diffusing element partially surrounding said roller element in a manner of heat radiation.

11. A hot laminating apparatus for laminating a sheet material between thin films, comprising:

a heating plate having a heater at a first free end and a heat-conducting plate at a second free end; and a transmitting and heating roller cooperating with said heat-conducting plate to clamp said thin films and rotating to move relative to said thin films so as to heat and laminate different area of said thin films.

12. The hot laminating apparatus according to claim 11 wherein said heat-conducting plate is made of aluminum.

13. The hot laminating apparatus according to claim 11 wherein said heat-conducting plate has a curved surface facing said transmitting and heating roller so as to provide a heating condition substantially equivalent to said transmitting and heating roller for said thin films.

14. The hot laminating apparatus according to claim 11 wherein said transmitting and heating roller includes:

an electro-heater for transforming electric energy into thermal energy; and a roller element disposed between said electro-heater and said heating plate for transmitting said thermal energy from said electro-heater to said thin films.

15. The hot laminating apparatus according to claim 14 wherein said electro-heater of said transmitting and heating roller is wrapped with said roller element, and transmits said thermal energy to said roller element in a manner of heat conduction.

16. The hot laminating apparatus according to claim 14 wherein said electro-heater of said transmitting and heating roller is arranged outside said roller element and transmits said thermal energy to said roller element via a heat-diffusing element partially surrounding said roller element in a manner of heat radiation.

17. The hot laminating apparatus according to claim 11 wherein said heat-conducting plate is an aluminum extrusion plate.

* * * * *